United States Patent
Kwag et al.

(10) Patent No.: US 8,137,836 B2
(45) Date of Patent: Mar. 20, 2012

(54) LITHIUM RECHARGEABLE BATTERY WITH RESIN MOLDING PART AND OUTER COVERS

(75) Inventors: Nohyun Kwag, Yongin-si (KR);
Kyungwon Seo, Yongin-si (KR);
Sangjoo Lee, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1188 days.

(21) Appl. No.: 11/907,941

(22) Filed: Oct. 18, 2007

(65) Prior Publication Data
US 2008/0096101 A1   Apr. 24, 2008

(30) Foreign Application Priority Data
Oct. 24, 2006   (KR) .................. 10-2006-0103371

(51) Int. Cl.
*H01M 2/02*   (2006.01)
(52) U.S. Cl. ........................ 429/167; 429/163
(58) Field of Classification Search .................. 429/163, 429/167
See application file for complete search history.

(56) References Cited

U.S. PATENT DOCUMENTS

| | | | | |
|---|---|---|---|---|
| 6,117,576 | A * | 9/2000 | Sugai ........................ | 429/7 |
| 6,524,732 | B1 * | 2/2003 | Iwaizono et al. ............ | 429/7 |
| 6,893,753 | B2 | 5/2005 | Iwaizono et al. | |
| 2005/0003267 | A1 * | 1/2005 | Kumakiri et al. ............ | 429/163 |
| 2006/0154138 | A1 * | 7/2006 | Miyamoto et al. ........... | 429/130 |

FOREIGN PATENT DOCUMENTS

| | | |
|---|---|---|
| EP | 1093178 A1 | 4/2001 |
| GB | 2377079 A | 6/2002 |
| JP | 2002-050329 | 2/2002 |
| JP | 2006-164558 A | 6/2006 |
| KR | 100535739 B1 | 9/2000 |
| KR | 10-2005-0035739 | 4/2005 |
| KR | 10-2006-0085115 | 7/2006 |
| KR | 100659866 B1 | 12/2006 |
| KR | 100685115 B1 | 2/2007 |
| WO | WO2005/025270 | 3/2005 |
| WO | 2006067918 A2 | 6/2006 |

* cited by examiner

*Primary Examiner* — Barbara Gilliam
*Assistant Examiner* — Zachary Best
(74) *Attorney, Agent, or Firm* — Robert E. Bushnell, Esq.

(57) ABSTRACT

The present invention relates to a lithium rechargeable battery having outer covers, each having a rib formed on the inner surface thereof, coupled to both sides of a core pack, which makes it possible to prevent resin from flowing into the outer covers when resin molding parting is performed on an upper part of the core pack and thus to reduce defects occurring in the outer covers due to the flow of resin.

A lithium rechargeable battery according to an embodiment of the invention includes a core pack having a bare cell and a protective circuit module which is arranged on the top side of the bare cell so as to be electrically connected to the bare cell through lead plates; outer covers covering two short lateral sides of the core pack on which the lead plates are provided; and a resin molding part formed at an upper part of the core pack, the upper part of the core pack includes a portion of each of the outer covers and the protective circuit module. In the lithium rechargeable battery, ribs are formed on the inner surfaces of the outer covers to isolate gaps formed between the outer covers and the two short lateral sides of the core pack due to the lead plates from the resin molding part.

17 Claims, 16 Drawing Sheets

LITHIUM RECHARGEABLE BATTERY WITH RESIN MOLDING PART AND OUTER COVERS

CLAIM OF PRIORITY

This application makes reference to, incorporates the same herein, and claims all benefits accruing under 35 U.S.C. §119 from an application for LITHIUM RECHARGEABLE BATTERY earlier filed in the Korean Intellectual Property Office on 24 Oct. 2006 and there duly assigned Serial No. 10-2006-0103371.

BACKGROUND OF THE INVENTION

1. Field of the Invention

The present invention relates to a lithium rechargeable battery, and more particularly, to a lithium rechargeable battery having outer covers, each having ribs formed on an inner surface of the outer covers, coupled to both sides of a core pack, which makes it possible to prevent resin from flowing into the outer covers when resin molding parting is performed on an upper part of the core pack and thus reduces defects occurring in the outer covers due to the flow of resin.

2. Description of the Related Art

In general, as the light-weightness and high-functionality of portable radio apparatuses, such as video cameras, mobile phones, and portable computers, have continued to progress, numerous researches for rechargeable batteries used as power sources have been made. Such rechargeable batteries include, for example, a nickel-cadmium battery, a nickel-metal hydride battery, a nickel-zinc battery, and a lithium rechargeable battery. Among them, the lithium rechargeable battery that can be made in a small size with a high capacity has come into widespread use in the field of high-tech electronic apparatuses due to its advantages such as a high operation voltage and a high energy density per unit weight.

A lithium rechargeable battery pack is formed in such a manner that, after safety devices, such as a PTC (positive temperature coefficient) element, a thermal fuse, and a protective circuit module (hereinafter, referred to as a PCM), are mounted to a bare cell which has an electrode assembly having a positive electrode plate, a negative electrode plate, and a separator, a can for housing the electrode assembly and an electrolyte, and a cap assembly sealing up a top side opening of the can, the bare cell having the safety devices mounted thereto is put into a separate case, or gaps in the bare cell are filled up with a hot-melt resin and a tubing process using a thin wrapping material and a labeling process are sequentially performed on the bare cell.

The safety device is connected to a positive electrode terminal and a negative electrode terminal of the bare cell through lead plates, said lead plates are conductive members, to break an electric current when an internal temperature of the battery increases or a voltage rises due to the overcharge of the battery, thereby preventing the combustion and/or explosion of the battery.

A battery pack according to the related art includes: a core pack that includes a bare cell capable of performing discharge and charge and having an electrode terminal protruding from one short lateral side thereof and a protective circuit module connected to the top side of the bare cell; a resin molding part that is formed by a hot-melt method using a hot-melt resin at an upper part of the core pack having the protective circuit module, to be mounted on an external set and to prevent the protective circuit module separating from the bare cell; and outer covers that cover both sides of the core pack to form a portion of the appearance of the battery pack.

In such a battery pack, an electrode terminal protruding from one short lateral side of the bare cell and other short lateral side of the bare cell having a polarity opposite to that of the electrode terminal are electrically connected to electrical connection terminals formed on the protective circuit module that is provided on the top side of the bare cell through lead plates each bent in a substantially "L" shape, respectively. That is, respectively, one end of each lead plate is electrically connected to the electrode terminal protruding from one short lateral side and the other short lateral side of the bare cell, and the other end of each lead plate is electrically connected to the electrical connection terminals of the protective circuit module arranged on the top side of the bare cell. Herein, the one short lateral side and the other short lateral side of the bare cell mean sides having a small width among the sides of the bare cell except for the top side of the bare cell on which the protective circuit module is arranged and the bottom side opposite to the top side.

In this way, since the ends of each lead plate are respectively connected to the electrode terminal protruding from one short lateral side and the other short lateral side of the bare cell, the lead plates are exposed from one short lateral side and the other short lateral side of the bare cell, respectively. Therefore, in order to cover one short lateral side and the other short lateral side of the bare cell, outer covers are coupled to one short lateral side and the other short lateral side of the bare cell. In this case, a gap is formed between the one short lateral side of the bare cell and the outer cover due to the lead plate connected to one short lateral side of the bare cell. In addition, a gap is formed between the other short lateral side of the bare cell and the outer cover due to the lead plate connected to the other short lateral side of the bare cell.

Therefore, when the outer covers are coupled to one short lateral side and the other short lateral side of the bare cell and then a hot-melt resin is filled into a gap between the protective circuit module and the bare cell so as to form a resin molding part, a fluid hot-melt resin flows in the downward direction of the outer covers through the gaps between the outer covers and one short lateral side and the other short lateral side of the bare cell.

However, when the hot-melt resin continuously flows into the gaps in the downward direction of the outer covers due to high pressure even after the gaps are filled up with the hot-melt resin, the hot-melt resin leaks from the outer covers to the outside due to high pressure. As a result, defects occurring in the appearance of the battery pack results in an increase of the defect rate of a battery pack.

SUMMARY OF THE INVENTION

It is therefore an object of the present invention to provide a improved lithium rechargeable battery having outer covers, each having ribs formed on an inner surface thereof, coupled to both sides of a core pack, which prevents resin from flowing into the outer covers when resin molding parting is performed on an upper part of the core pack and thus to reduce defects occurring in the outer covers due to the flow of resin.

Accordingly, the present invention has been contrived to solve the drawbacks of prior art, and an object of the present invention is to provide a lithium rechargeable battery having outer covers, each having ribs formed on the inner surface thereof, coupled to both sides of a core pack, which makes it possible to prevent resin from flowing into the outer covers when resin molding parting is performed on an upper part of the core pack and thus to reduce defects occurring in the outer covers due to the flow of resin.

In order to accomplish the object of the present invention, according to an aspect of the invention, a lithium rechargeable battery includes a core pack which includes a bare cell and a protective circuit module arranged on the top side of the bare cell so as to be electrically connected to the bare cell through lead plates; outer covers covering two short lateral sides of the core pack on which the lead plates are provided; and a resin molding part formed at an upper part of the core pack, said upper part of the core pack including a portion of each of the outer covers and the protective circuit module. In the lithium rechargeable battery, ribs are formed on the inner surfaces of the outer covers to isolate gaps formed between the outer covers and the two short lateral sides of the core pack due to the lead plates from the resin molding part.

The ribs may be formed in bar shapes to fill up the gaps.

The lead plates may include a first lead plate and a second lead plate. The first lead plate may include a first coupling portion that is connected to an electrode terminal protruding from one short lateral side of the bare cell but is insulated from the one short lateral side, and a first connecting portion that is bent and extended from the first coupling portion and is electrically connected to a first electrical connection terminal of the protective circuit module with being insulated from the top side of the bare cell. The second lead plate may include a second coupling portion that is connected to the other short lateral side of the bare cell, and a second connecting portion that is bent and extended from the second coupling portion and is arranged on the top side of the bare cell so as to be connected to a second electrical connection terminal.

Both of the first and second coupling portions may have a smaller width than that of the one short lateral side or the other short lateral side of the bare cell.

The outer covers may be composed of a first outer cover covering the one short lateral side of the core pack and a second outer cover covering the other short lateral side. A first rib formed on the inner surface of the first outer cover may include first vertical bars extending to first areas, which are portions of the one short lateral side, said portions do not overlap the first coupling portion. A second rib formed on the inner surface of the second outer cover may include second vertical bars extending to second areas, which are portions of the other short lateral side, said portions do not overlap the second coupling portion.

The first rib may further include a first horizontal bar that is provided at a position separated from the top side of the first vertical bars by a distance corresponding to the distance from the top side of the bare cell to the outer surface of the first connecting portion, and first connecting bars that connect the first horizontal bar to the first vertical bars.

The second rib may further include a second horizontal bar that is provided at a position separated from the top side of the second vertical bars by a distance corresponding to the distance from the top side of the bare cell to the outer surface of the second connecting portion, and second connecting bars that connect the second horizontal bar to the second vertical bars.

The first outer cover may include a first plane that has a shape corresponding to that of the one short lateral side of the bare cell and a first skirt surface that extends from at least a portion of the edge of the first plane in a direction so as to cover two long lateral sides and the bottom side of the bare cell The second outer cover may include a second plane that has a shape corresponding to that of the other short lateral side of the bare cell and a second skirt surface that extends from at least a portion of the edge of the second plane in a direction so as to cover the two long lateral sides and the bottom side of the bare cell.

The first rib may be arranged in a portion that comes into a surface contact with the resin molding part, among the edges where the first plane and the first skirt surface intersect each other. The second rib may be arranged in a portion that comes into a surface contact with the resin molding part, among the edges where the second plane and the second skirt surface intersect each other.

Both of the first skirt surface and the second skirt surface may be formed in a U shape without having a portion corresponding to the upper part of the core pack where the resin molding part is formed.

The first vertical bars may protrude from the inner surface of the first plane. The projection height of each of the first vertical bars may be equal to the distance from the one short lateral side of the bare cell to the outer surface of the first coupling portion, and the widths of the first vertical bars may be equal to a difference between the width of the one short lateral side of the bare cell and the width of the first coupling portion. The second vertical bars may protrude from the inner surface of the second plane. The projection height of each of the second vertical bars may be equal to the distance from the other short lateral side of the bare cell to the outer surface of the second coupling portion, and the widths of the second vertical bars may be equal to the difference between the width of the other short lateral side of the bare cell and the width of the second coupling portion.

An insulating tape may be provided in a gap between the inner surface of the first coupling portion and the one short lateral side of the bare cell. The insulating tape may have a thickness equal to the height of the electrode terminal protruding from the one short lateral side of the bare cell.

A base plate may be further provided between the other short lateral side of the bare cell and the inner surface of the second coupling portion.

The rib may be integrally formed with the corresponding outer cover.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the invention will be described in detail with reference to the accompanying drawings.

Figure 1:
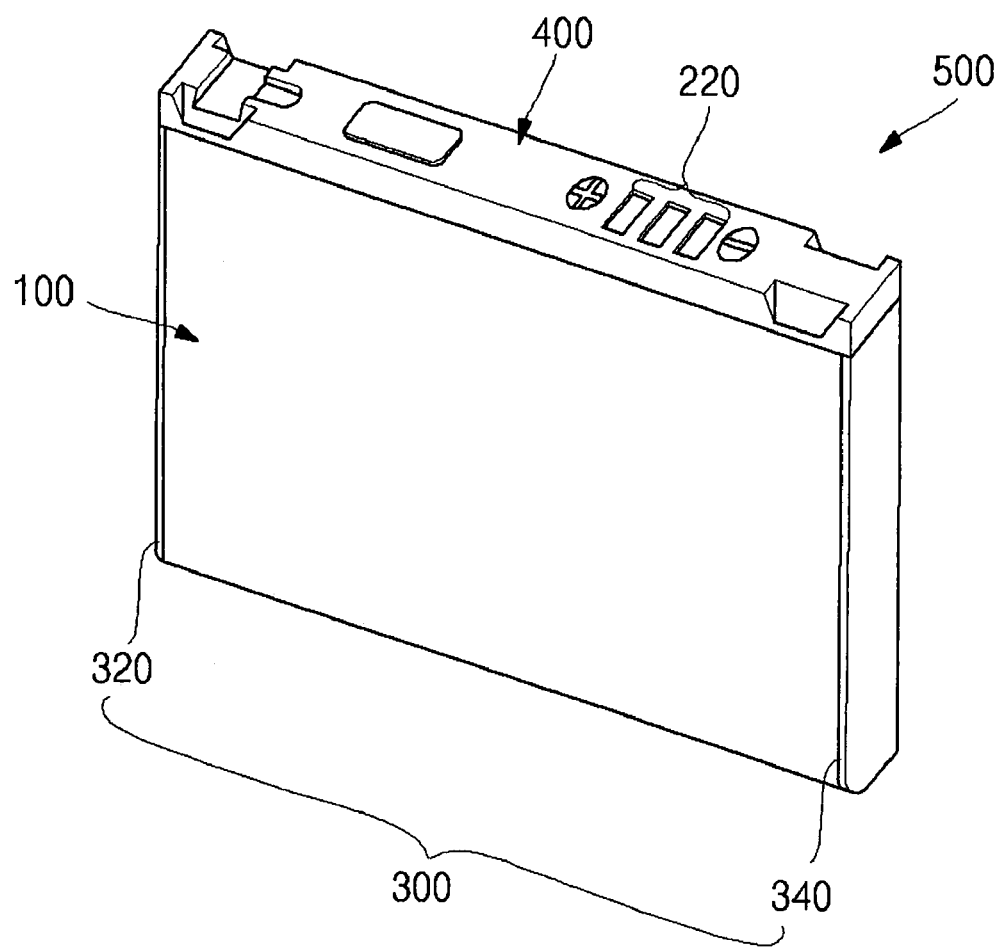
FIG. 1 is a perspective view illustrating a lithium rechargeable battery according to a first embodiment of the invention.
Figure 2:
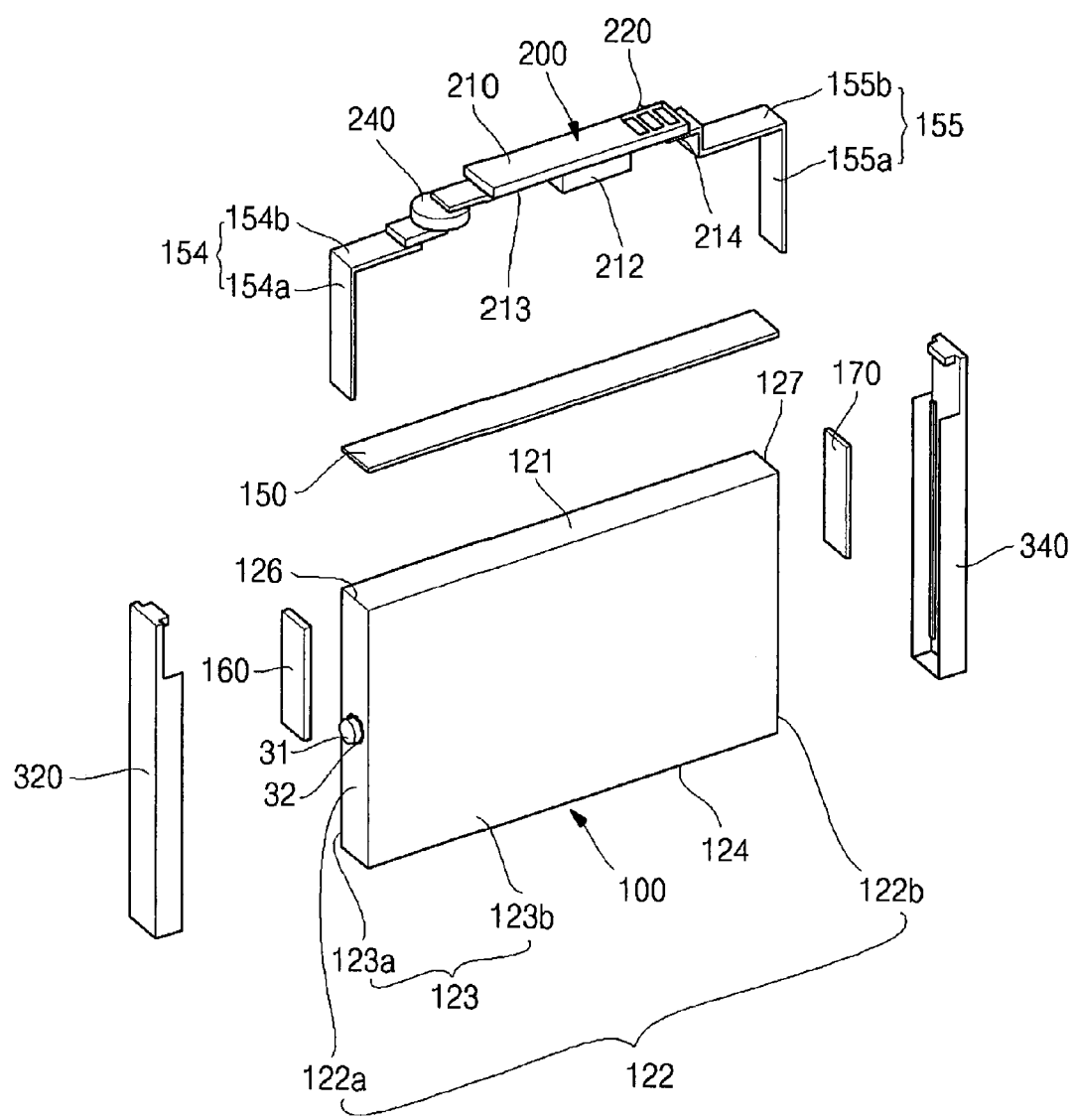
FIG. 2 is a partial exploded perspective view illustrating the lithium rechargeable battery according to the first embodiment of the invention before a resin molding part is formed.
Figure 3:
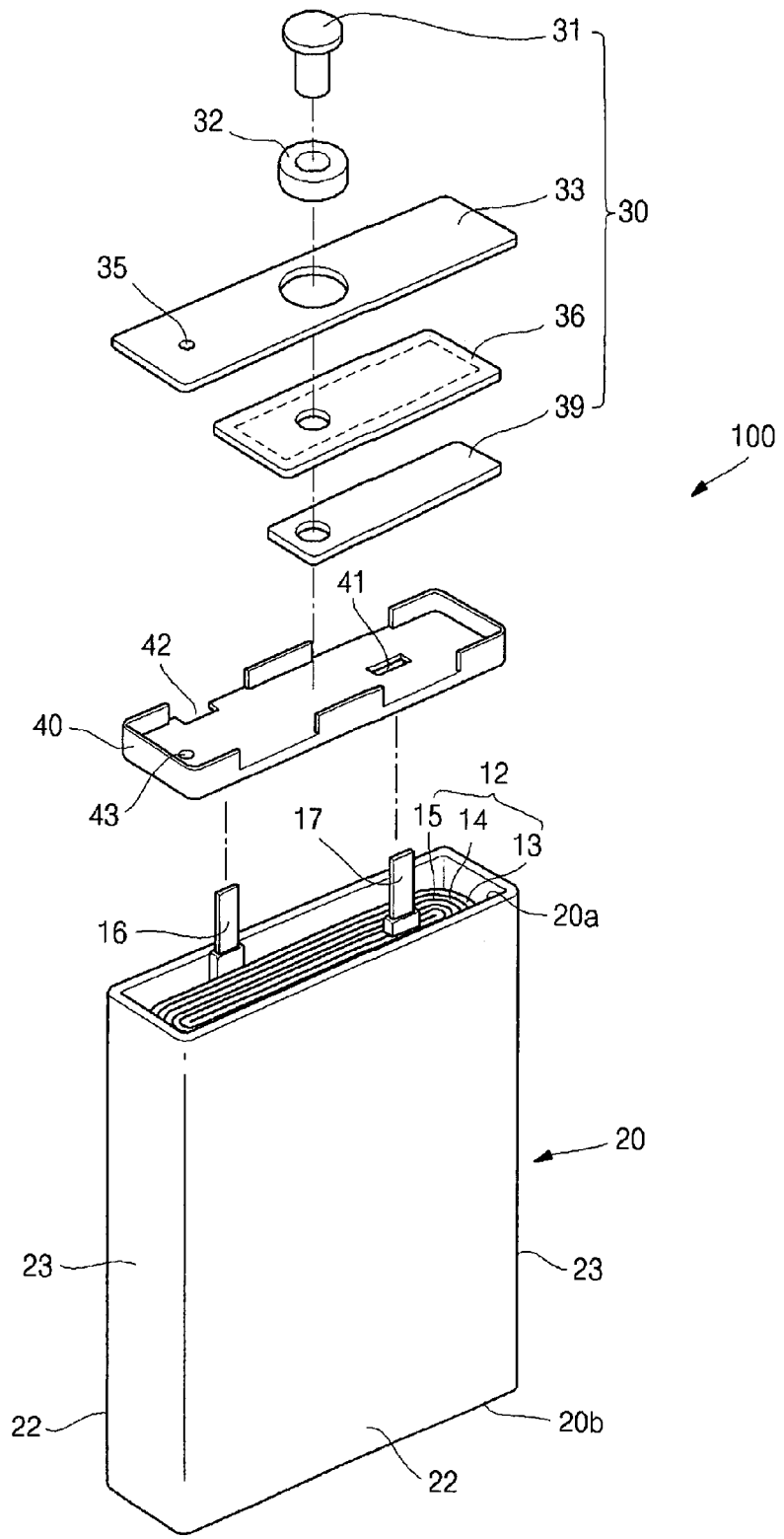
FIG. 3 is an exploded perspective view illustrating a bare cell of the lithium rechargeable battery according to the first embodiment of the invention.
Figure 4:
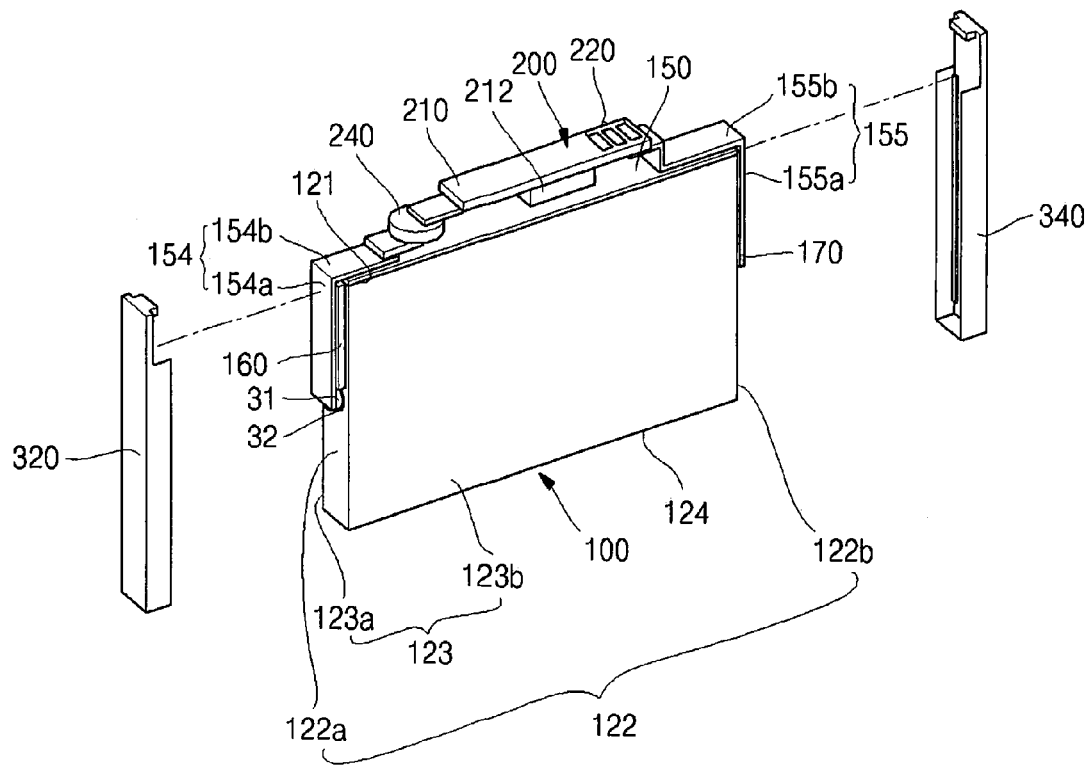
FIG. 4 is a perspective view illustrating the lithium rechargeable battery shown in FIG. 2 before outer covers are coupled thereto.

Turning now to the drawings, FIGS. 1 through 4 collectively, FIG. 1 is a perspective view illustrating a lithium rechargeable batter according to a first embodiment of the invention, FIG. 2 is a partial exploded perspective view illustrating the lithium rechargeable battery according to the first embodiment of the invention before a resin molding part is formed, FIG. 3 is an exploded perspective view illustrating a bare cell of the lithium rechargeable battery according to the first embodiment of the invention, FIG. 4 is a perspective view illustrating the lithium rechargeable battery shown in FIG. 2 before an outer cover is coupled thereto.

Referring to FIGS. 1 and 2, a lithium rechargeable battery 500 in accordance with the first embodiment of the invention includes: a core pack having a bare cell 100 and a protective circuit module 200 that is provided on the top side of bare cell 100 so as to be electrically connected to the bare cell 100; an outer cover 300 that covers both short lateral sides of the core pack; and a resin molding part 400 that is formed at an upper part of the core pack and the upper part of the core pack includes protective circuit module 200 and a portion of outer cover 300.

Referring to FIG. 3, bare cell 100 is formed by putting an electrolyte and an electrode assembly 12 composed of a positive electrode plate 13, a negative electrode plate 15, and a separator 14, into a can 20 and sealing up an upper opening 20a of can 20 with a cap assembly 30. As shown in FIG. 2, the appearance of bare cell 100 is composed of a top side 121, a pair of short lateral sides 122, a pair of long lateral sides 123, and a bottom side 124.

Electrode assembly 12 is formed by winding positive electrode plate 13 and negative electrode plate 15, and separator 14 interposed between positive electrode plate 13 and negative electrode plate. A positive electrode tap 16 is provided in the positive electrode plate 13, and a negative electrode tap 17 is provided in negative electrode plate 15. Separator 14 insulates positive electrode plate 13 from negative electrode plate 15 and is formed of a porous film capable of transmitting an electrolyte.

Cap assembly 30 includes a cap plate 33, an insulating plate 36, a terminal plate 39, and an electrode terminal 31. A gasket tube 32 is inserted between electrode terminal 31 and cap plate 33 forming one short lateral side 122a of bare cell 100, and electrode terminal 31 is electrically connected to terminal plate 39. Insulating plate 36 insulates cap plate 33 from terminal plate 39. An electrolyte inlet 35 is formed in cap plate 33. Electrolyte inlet 35 is provided with a stopper (not shown) for closing up the electrolyte inlet after the electrolyte is injected.

Can 20 is formed in a substantially rectangular box shape including a pair of long lateral sides 22 that are formed so as to face each other and to form the pair of long lateral sides 123 of the bare cell, a pair of short lateral sides 23 forming top side 121 and bottom side 124 of bare cell 100, and a bottom side 20b forming the other short lateral side 122b of the bare cell 100. Upper part of the can 20 is opened to form top side opening 20a. Further, since can 20 is formed in a substantially rectangular box shape, the shape of the cross section thereof in the horizontal direction is a rectangle. Electrode assembly 12 is inserted through top side opening 20a. Upper part of the can 20 is sealed up by cap assembly 30 to prevent the electrolyte from leaking out. Can 20 is preferably formed of a light and ductile metallic material, such as aluminum or an aluminum alloy, but the material forming can 20 is not limited thereto. Can 20 is preferably formed by a deep drawing method such that long lateral side 22, short lateral side 23, bottom side thereof 20b are integrally formed.

Meanwhile, an insulating case 40 is formed on the top side of electrode assembly 12 to electrically insulate electrode assembly 12 from cap assembly 30 and to cover the top side of electrode assembly 12. Insulating case 40 is preferably formed of an insulating polymer resin, such as polypropylene. A hole 41 for a negative electrode tap is formed in insulating case 40 at a position close to one end in the lateral direction, and negative electrode tap 17 of electrode assembly 12 passes through hole 41. In addition, a hole 42 for a positive electrode tap is formed in insulating case 40 at a position corresponding to positive electrode tap 16 that is closed to the other end in the lateral direction. A hole 43 for an electrolyte may not be provided.

Protective circuit module 200 and bare cell 100 having the above-mentioned structure are electrically connected to each other to form a care pack.

Referring to FIG. 2, protective circuit module 200 includes a protective circuit board 210 and external terminals 220 formed on protective circuit board 210.

Protective circuit board 210 includes protective circuits, such as a circuit for controlling the charge or discharge of a battery to make a charged state uniform and a circuit for preventing overcharge and overdischarge. In order to realize these circuits, circuit elements 212 provided on protective circuit board 210 in FIG. 2. Although only one circuit element is shown in the drawing, this invention is not necessarily limited to have only one circuit element.

Protective circuit board 210 further includes first electrical connection terminal 213 and second electrical connection terminal 214 for electrical connection to electrode terminal 31 protruding from the one short lateral side 122a of the bare cell and the other short lateral side 122b of the bare cell, respectively. First lead plate 154 and second lead plate 155 are provided to connect first electrical connection terminal 213 and second electrical connection terminal 214 of protective circuit module 200 to the electrode terminal 31 and to the other short lateral side 122b of bare cell 100, respectively. In this embodiment, electrode terminal 31 serves as a negative electrode, and the first electrical connection terminal 213 electrically connected to electrode terminal 31 is a negative electrode terminal. The other short lateral side 122b of the bare cell serves as a positive electrode having a polarity opposite to that of electrode terminal 31, and second electrical connection terminal 214 electrically connected to the other short lateral side 122b is a positive electrode terminal. Of course, as another embodiment, electrode terminal 31 may serve as a positive electrode, and the other short lateral side 122b may serve as a negative electrode.

Both of first lead plate 154 and second lead plate 155 are bent in a substantially "L" shape. That is, first lead plate 154 has a bent portion at a first edge 126 where top side 121 and the one short lateral side 122a of bare cell 100 are connected to each other, and second lead plate 155 has a bent portion at a second edge 127 where top side 121 and the other short lateral side 122b of the bare cell 100 are connected to each other.

First lead plate 154 includes a first coupling portion 154a that is connected to electrode terminal 31 but is insulated from the one short lateral side 122a of bare cell 100, and a first connecting portion 154b that is bent and extended from first coupling portion 154a so as to be connected to first electrical connection terminal 213 of protective circuit module 200 but insulated from top side 121 of bare cell 100. Second lead plate 155 includes a second coupling portion 155a that is connected to the other short lateral side 122b of the bare cell 100, and a second connecting portion 155b that is bent and extended from the second coupling portion and is arranged on top side 121 of bare cell 100 so as to be connected to second electrical connection terminal 214 of protective circuit module 200. First lead plate 154 and second lead plate 155 are formed of a conductive material, such as nickel or a nickel alloy, to electrically connect bare cell 100 to protective circuit module 200.

Meanwhile, an insulating tape 160 is provided in a gap between the inner surface of first coupling portion 154a and one short lateral side 122a of bare cell 100, due to electrode terminal 31 protruding from the one short lateral side 122a of bare cell 100. Insulating tape 160 prevents electrical short between first lead plate 154 having a negative polarity and the one short lateral side 122a of bare cell 100 having a positive polarity. Insulating tape 160 has a thickness equal to the height of electrode terminal 31 protruding from the one short lateral side 122a of bare cell 100 such that first coupling portion 154a of first lead plate 154 is connected in a line to electrode terminal 31.

A base plate 170 formed of, for example, nickel is provided between second coupling portion 155a of second lead plate 155 and the other short lateral side 122b of bare cell 100 and is weld to the other lateral side 122b of bare cell 100 beforehand, so that second coupling portion 155a of second lead plate 155 is not directly welded to the other lateral side 122b of bare cell 100. The reason is as follows. It is difficult to join second lead plate 155 formed of nickel to the other short lateral side 122b of bare cell 100 formed of aluminum by using ultrasonic welding due to the insolubility of nickel, and it is also difficult to join the two members by using resistance welding due to high conductivity of aluminum. Therefore, laser welding is used to join the two members, but when the laser welding is directly performed on second lead plate 155, a laser beam may be directly radiated onto the protective circuit module, which results in low reliability. For the reason presented above, the laser welding is firstly performed to join base plate 170 to the other short lateral side 122b of bare cell 100, and the ultrasonic welding is secondly performed to join base plate 170 to second coupling portion 155a of second lead plate 155.

Protective circuit module 200 may further include a current breaking element 240, such as a PTC (positive temperature coefficient) element or a thermal breaker, provided between protective circuit board 210 and first lead plate 154 formed on one side of top side 121 of bare cell 100.

Current breaking element 240 has one end connected to first electrical connection terminal 213 and the other end connected to first connecting portion 154b of first lead plate 154. Current breaking element 240 breaks a current to prevent the combustion or explosion of the battery, when the internal temperature of the battery increases or a voltage rises due to overcharge of the battery.

Protective circuit module 200 further includes external terminals 220 that are provided on protective circuit board 210 to electrically connect protective circuit module 200 to an external electronic apparatus (not shown). External terminals 220 are provided so as to be exposed.

An insulating sheet 150 may be further provided on top side 121 of bare cell 100 in order to prevent a short circuit between protective circuit module 200 and bare cell 100.

As shown in FIG. 4, protective circuit module 200 having the above-mentioned structure is coupled to top side 121 of bare cell 100, with being electrically connected to first and second lead plates 154 and 155, to form a core pack.

In this case, first coupling portion 154a and second coupling portion 155a are arranged on the one short lateral side 122a and the other short lateral side 122b of bare cell 100 so as to be exposed, respectively. Then, an outer cover 300 for forming a portion of the outward appearance of the lithium rechargeable battery is coupled to the one short lateral side 122a and the other short lateral side 122b of bare cell 100 on which portions of the first lead plate 154 and second lead plate 155 are provided respectively. Outer cover 300 includes a first outer cover 320 and a second outer cover 340. First outer cover 320 covers one short lateral side of the core pack, and second outer cover 340 covers the other short lateral side of the core pack. The structure of outer cover 300 and the arrangement structure of first and second lead plates 154 and 155 on bare cell 100 will be described in details later.

Resin molding part 400 is formed at the upper part of the core pack, in which the upper part of the core pack includes a portion of outer cover 300 and protective circuit module 200. In this case, resin molding part 400 is provided such that external terminals 220 provided on protective circuit module 200 are exposed. Resin molding part 400 functions to fix protective circuit module 200 to the bare cell 100 and forms a portion of the appearance of the lithium rechargeable battery.

As described above, outer cover 300 is coupled to both sides of the core back including bare cell 100 and protective circuit module 220 connected to each other, and then resin molding part 400 is provided at the upper part of the core pack, so that a lithium rechargeable battery 500 is manufactured.

Figure 5:
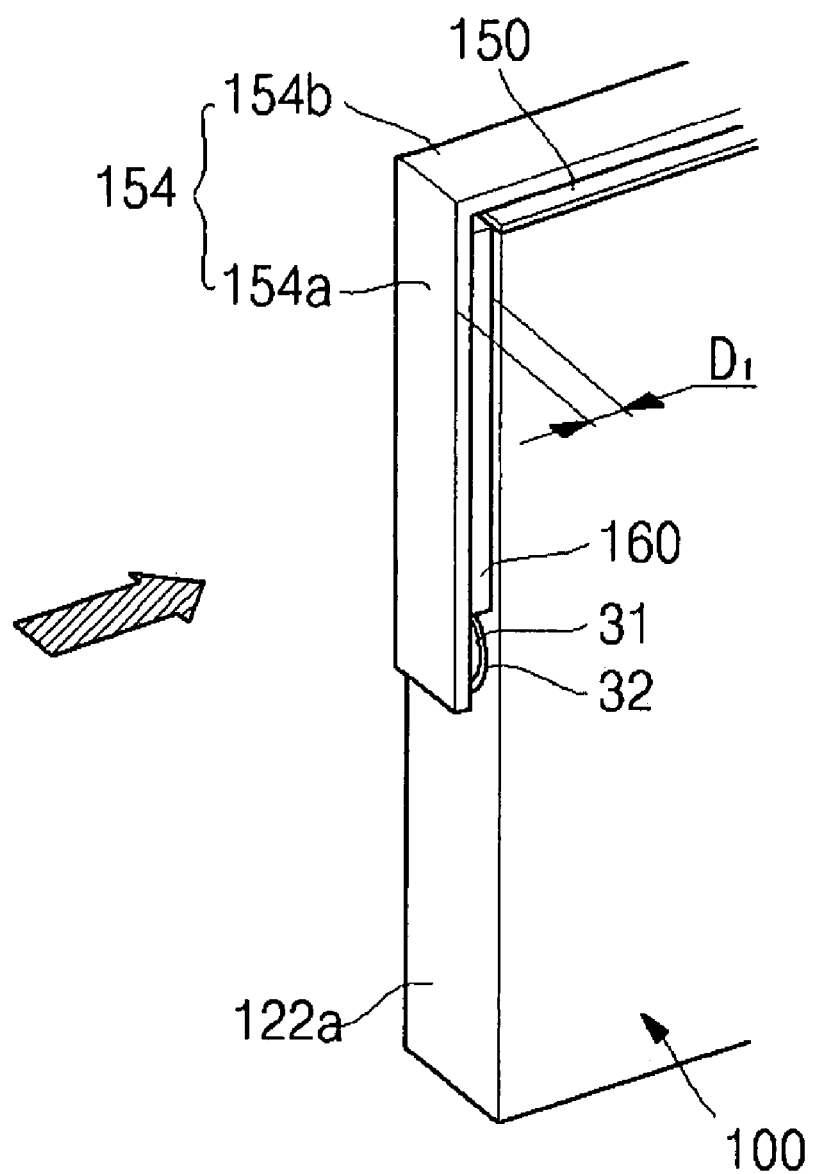
FIG. 5 is a partial perspective view illustrating a portion of the top side and one short lateral side of a core pack in the lithium rechargeable battery shown in FIG. 4.
Figure 6:
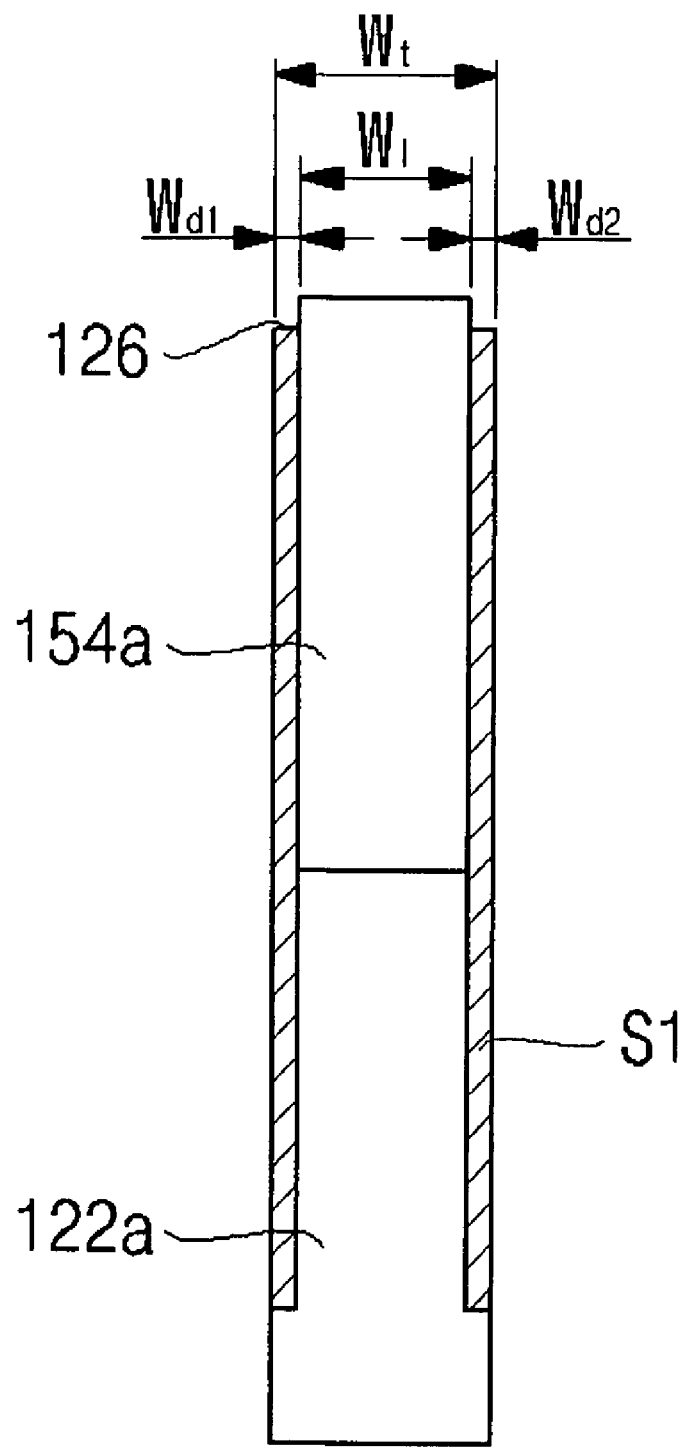
FIG. 6 is a plan view illustrating the one short lateral side of the core pack shown in FIG. 5, as viewed in the direction of arrow.
Figure 7:
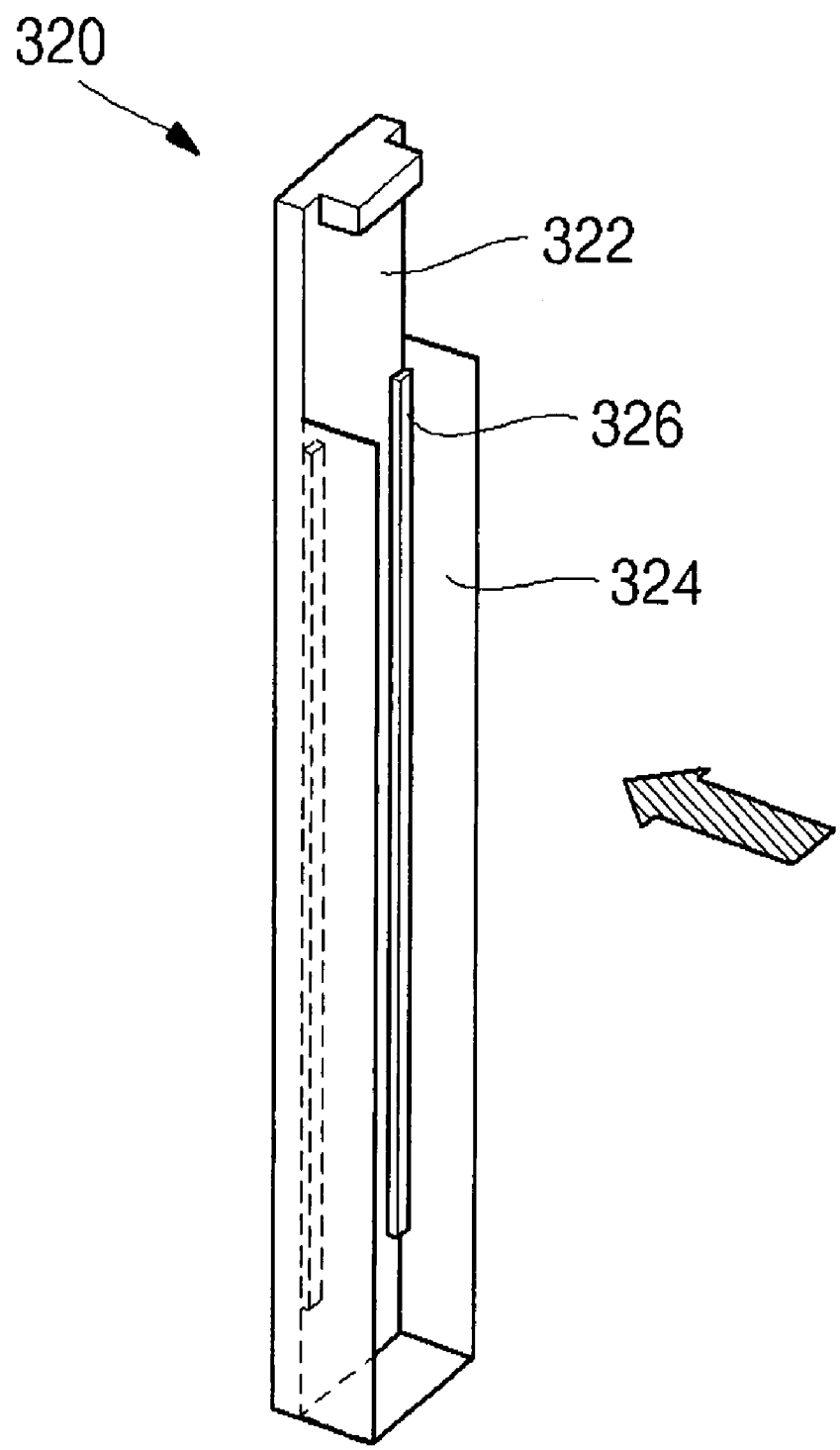
FIG. 7 is an enlarged perspective view illustrating a first outer cover of the lithium rechargeable battery shown in FIG. 2.
Figure 8:
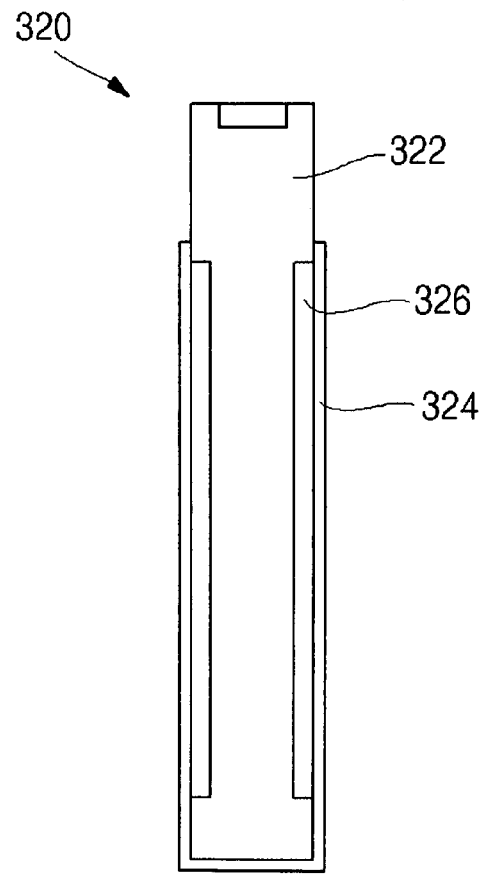
FIG. 8 is a plan view illustrating the first outer cover shown in FIG. 7, as viewed in the direction of arrow.
Figure 9:
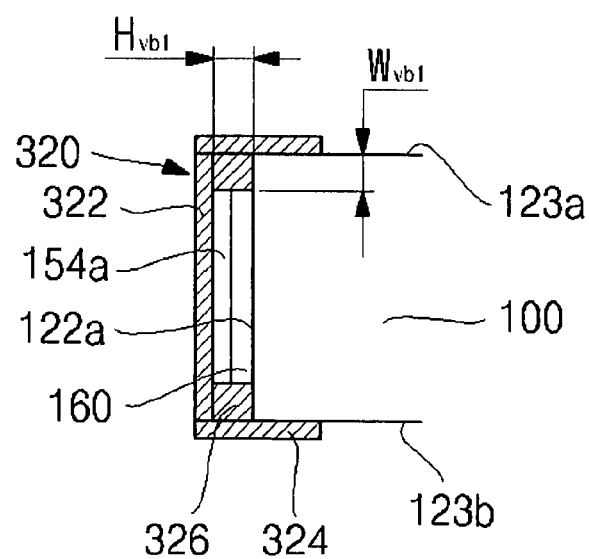
FIG. 9 is a partial sectional view partially illustrating a coupling portion between the first outer cover and the one short lateral side of the bare cell on which a lead plate is provided when the first outer cover shown in FIG. 7 is coupled to the one short lateral side of the core pack shown in FIG. 5.

Turning now to the drawings, FIGS. 5 through 9 collectively, FIG. 5 is a partial perspective view illustrating the one short lateral side and a portion of the upper part of the core pack in the lithium rechargeable battery shown in FIG. 4. FIG. 6 is a plan view of the one short lateral side of the core pack shown in FIG. 5, as viewed in the direction of arrow. FIG. 7 is an enlarged perspective view of the first outer cover of the lithium rechargeable battery shown in FIG. 2. FIG. 8 is a plan view of the first outer cover shown in FIG. 7, as viewed in the direction of arrow. FIG. 9 is a partial sectional view partially illustrating a coupling portion between the first outer cover and the one short lateral side of the bare cell having the lead plate provided thereon when the first outer cover is coupled to the one short lateral side of the core pack shown in FIG. 5.

Referring to FIGS. 5 and 6, first coupling portion 154a of first lead plate 154 is arranged above the one short lateral side 122a of bare cell 100 so as to be insulated from the one short lateral side 122a, and first connecting portion 154b is provided above top side 121 of bare cell 100 so as to be insulated therefrom.

More specifically, first coupling portion 154a of first lead plate 154 is connected to electrode terminal 31 while being adhered to adhesive insulating tape 160, and first connecting portion 154b connected to the first electrical connection terminal 213 of protective circuit module 200 shown in FIG. 2 by, for example, welding is arranged on top side 121 of bare cell 100. As shown in FIG. 5, first coupling portion 154a of first lead plate 154 is connected to electrode terminal 31 protruding from one short lateral side 122a of bare cell 100, which causes one short lateral side 122a of bare cell 100 to be separated from the outer surface of the first coupling portion 154a of first lead plate 154 by a distance $D_1$. As shown in FIG. 6, first lead plate 154 including first coupling portion 154a and first connecting portion 154b has a smaller width $W_1$ than width $W_t$ of the one short lateral side 122a of bare cell 100 so that it is easily arranged on the one short lateral side 122a and top side 121 of bare cell 100.

In FIG. 6, widths $W_{d1}$ and $W_{d2}$ indicate the difference between width $W_t$ of the one short lateral side 122a of bare cell 100 and width $W_1$ of first coupling portion 154a of first lead plate 154. Of course, first coupling portion 154a of first lead plate 154 may be coupled to the one short lateral side 122a of bare cell 100 such that their longitudinal edges are aligned with each other. In this case, the difference between the widths of first coupling portion 154a of first lead plate 154 and the one short lateral side 122a may be represented by only the width $W_{d1}$.

In FIG. 6, "S1" indicates a first area, which is a portion where the one short lateral side 122a of bare cell 100 that does not overlap first coupling portion 154a of first lead plate 154. First area S1 is formed from the upper part to lower part direction of one short lateral side 122a of bare cell 100 including first edges 126 at both sides of first coupling portion 154a.

As described before, first outer cover 320 that is formed beforehand by injection molding is coupled to one short lateral side 122a of bare cell 100 to cover one short lateral side 122a of bare cell 100 having first coupling portion 154a of first lead plate 154 provided thereon. The structure of first outer cover 320 will be described below with reference to FIGS. 7 to 9.

Referring to FIGS. 7 to 9, first outer cover 320 of the lithium rechargeable battery according to the first embodiment of the invention includes a first plane 322, a first skirt surface 324, and first ribs 326.

First plane 322 faces one short lateral side 122a of bare cell 100, and has a shape corresponding to that of one short lateral side 122a. In addition, first plane 322 extends up to top side 121 of bare cell 100.

First skirt surface 324 extends from at least a portion of the edge of first plane 322 in a direction, that is, toward the one short lateral side 122a of bare cell 100, so as to cover portions of two long lateral sides 123a and 123b and bottom side 124 of bare cell 100 shown in FIG. 2. In this embodiment, first skirt surface 324 extends from both sides and a lower end of first plane 322 in a "U" shape. That is, first skirt surface 324 extends in a "U" shape without having a portion corresponding to the upper part of the core pack where resin molding part 400 is formed. First skirt surface 324 is coupled to two long lateral sides 123a and 123b and bottom side 124 of bare cell 100 shown in FIG. 2 to cover one short lateral side 122a of bare cell 100.

First ribs 326 are formed in bar shapes to fill up gaps formed between first outer cover 320 and the one short lateral side 122a of bare cell 100 due to first lead plate 154 when first outer cover 320 is coupled to the one short lateral side 122a of bare cell 100. In this way, first ribs 326 can prevent resin from flowing into the gaps during a resin molding process of forming resin molding part 400 shown in FIG. 1. As a result, first ribs 326 are formed in a structure capable of isolating the gaps from resin molding part 400 formed by resin molding process.

More specifically, first ribs 326 protrude from portions where the inner surface of first outer cover 320, that is, edges where first plane 322 and first skirt surface 324 intersect each other so as to be provided in first area S1 of FIG. 6. In this embodiment of the invention, as shown in FIG. 7, first ribs 326 are formed in first vertical bar shapes at the edges where first skirt surface 324 and first plane 322 corresponding to first area S1 intersect each other so as to extend to first area S1. However, because it is possible to prevent resin from flowing into the gap by blocking only a start portion of a flow path of resin when resin molding part 400 is formed, first rib 326 may be formed in a bar shape in only a portion that comes into surface contact with resin molding part 400 shown in FIG. 1, among the edges where first plane 322 and first skirt surface 324 intersect each other. First ribs 326 may be integrally formed with first plane 322 and the first skirt surface 324.

As shown in FIG. 9, first rib 326 having a first vertical bar shape has a projection height $H_{vb1}$ equal to distance D1 from one short lateral side 122a of bare cell 100 shown in FIG. 5 to the outer surface of first coupling portion 154a of first lead plate 154. This structure removes the gap between the inner surface of first outer cover 320 and one short lateral side 122a of bare cell 100 having first coupling portion 154a of first lead plate 154 arranged thereon when first outer cover 320 is coupled to the one short lateral side 122a of bare cell 100. In addition, in order to remove the gap, width $W_{vb1}$ of first rib 326 is equal to one of widths $W_{d1}$ and $W_{d2}$ corresponding to the difference between width $W_t$ of the one short lateral side 122a of bare cell 100 and width $W_1$ of first coupling portion 154a of first lead plate 154.

As described above, each of first ribs 326 having the first vertical bar shape protrudes at a distance equal to distance $D_1$ from one short lateral side 122a of bare cell 100 to the outer surface of first coupling portion 154a of first lead plate 154, and width $W_{vb1}$ of first rib 326 is equal to one of widths $W_{d1}$ and $W_{d2}$ corresponding to the difference between width $W_t$ of the one short lateral side 122a of bare cell 100 and width $W_1$ of first coupling portion 154a of first lead plate 154, which enables first ribs 326 each having the first vertical bar shape to be provided in the gaps between the inner surface of first outer cover 320 and the one short lateral side 122a of the bare cell 100 when first outer cover 320 is coupled to the one short lateral side 122a of the bare cell 100. In this way, first ribs 326 fill up the gaps between at least the upper part of inner surface of first outer cover 320 and the one short lateral side 122a of bare cell 100, which makes it possible to prevent resin from flowing into first outer cover 320 through the gaps during a process of molding top side 121 of bare cell 100 including protective circuit module 200 with resin. Therefore, first ribs 326 prevent resin from flowing into first outer cover 320 and thus leaking from the lower part of first outer cover 320 due to high pressure. As a result, first ribs 326 make it possible to reduce defects in the appearance of first outer cover 320.

Figure 10:
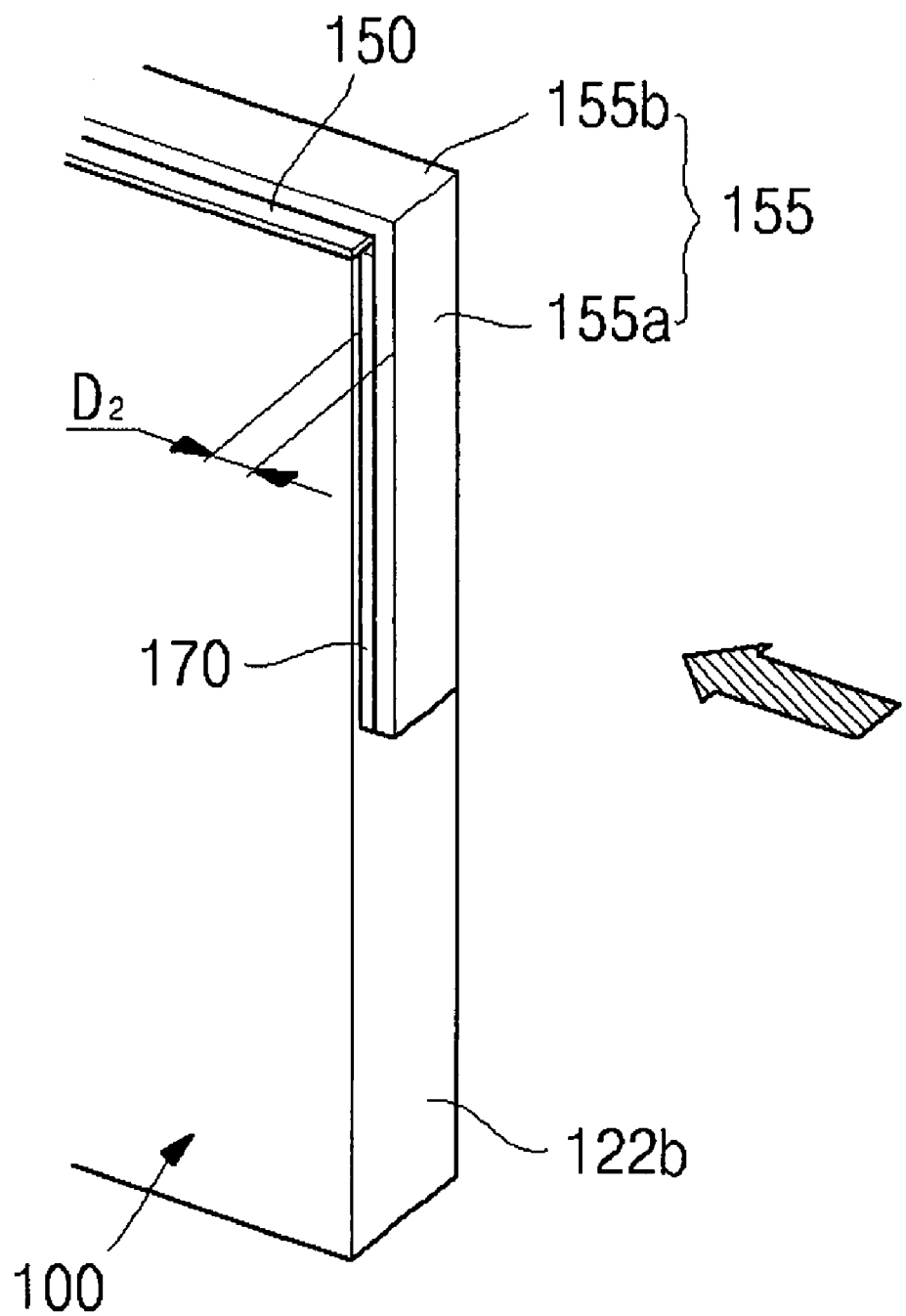
FIG. 10 is a partial perspective view illustrating a portion of the top side and the other short lateral side of the core pack in the lithium rechargeable battery shown in FIG. 4.
Figure 11:
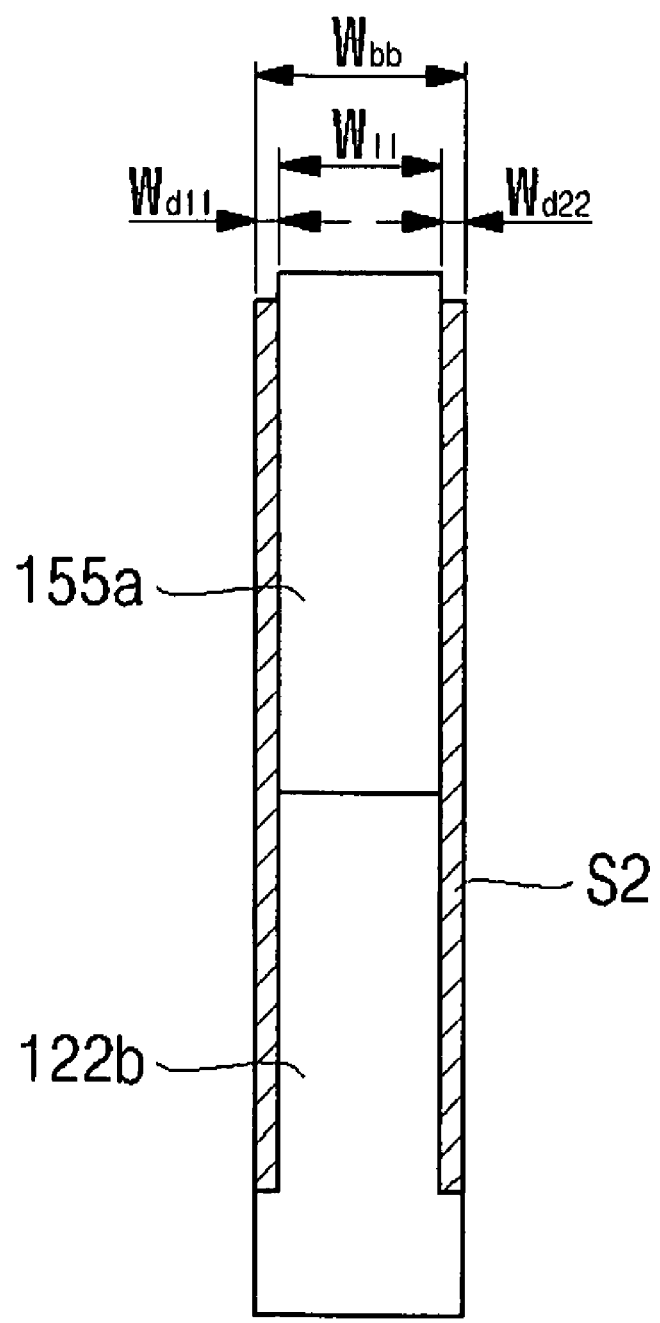
FIG. 11 is a side view illustrating the other short lateral side of the core pack shown in FIG. 10, as viewed in the direction of arrow.
Figure 12:
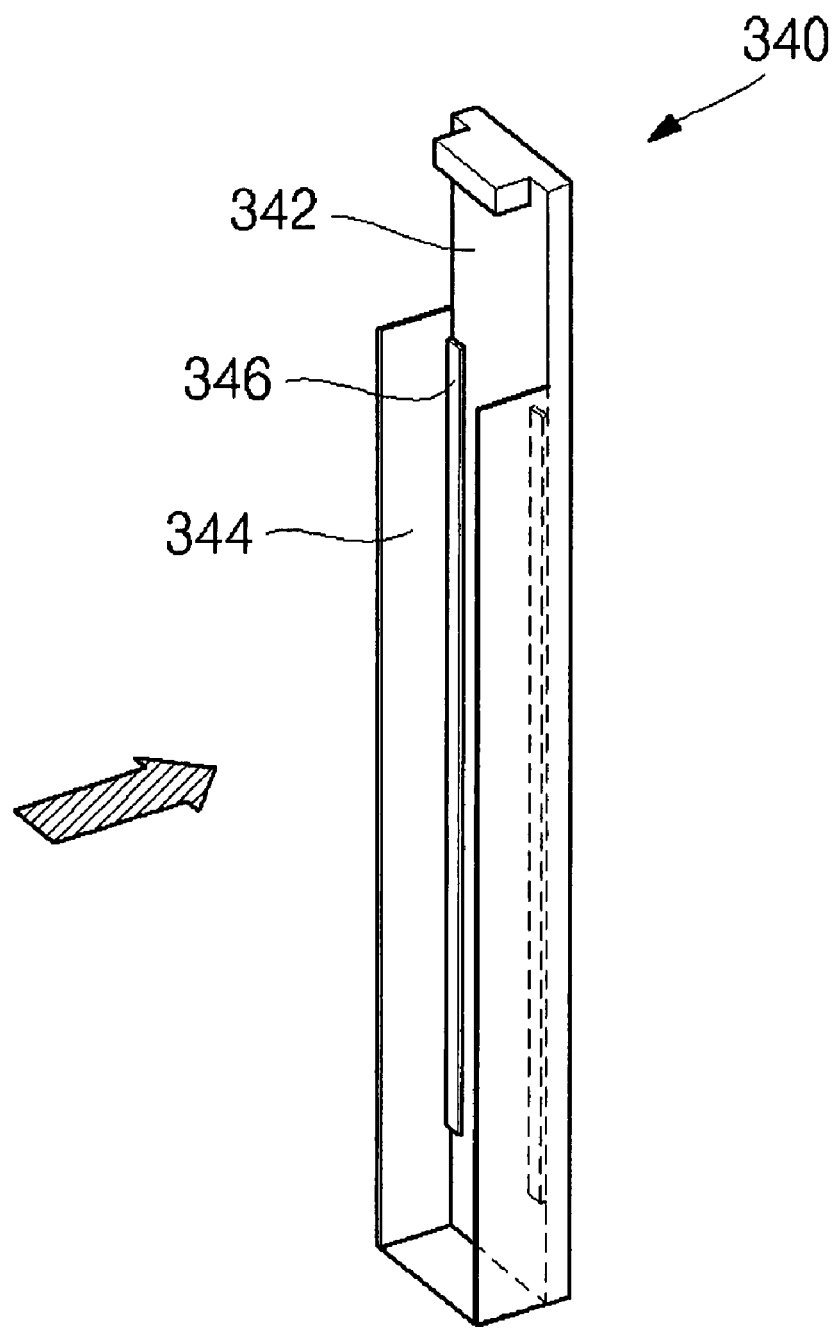
FIG. 12 is an enlarged perspective view of a second outer cover of the lithium rechargeable battery shown in FIG. 2.
Figure 13:
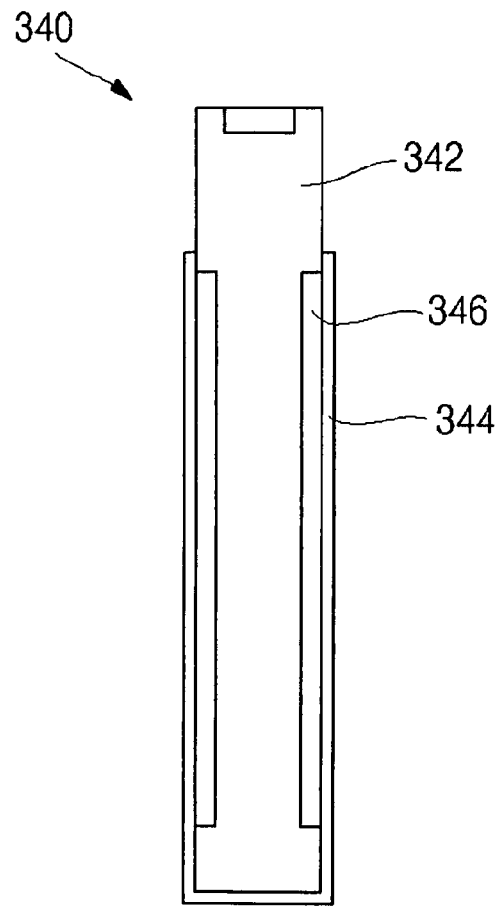
FIG. 13 is a plan view illustrating the second outer cover shown in FIG. 12, as viewed in the direction of arrow.
Figure 14:
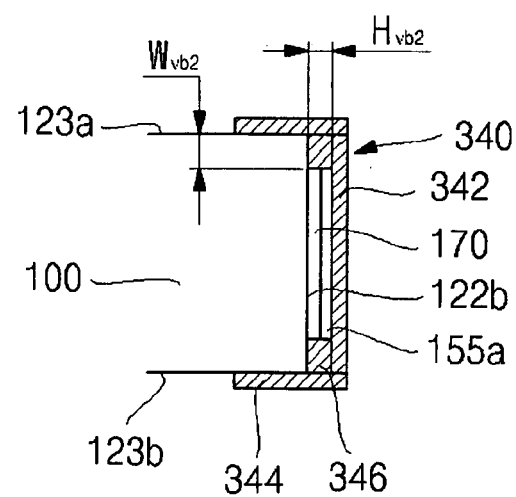
FIG. 14 is a partial sectional view partially illustrating a coupling portion between the second outer cover and the other short lateral side of the bare cell on which a lead plate is provided when the second outer cover shown in FIG. 12 is coupled to the other short lateral side of the core pack shown in FIG. 10.

Turning now to the drawings, FIGS. 10 through 14 collectively, FIG. 10 is a partial perspective view illustrating the other short lateral side and a portion of the upper part of the core pack in the lithium rechargeable battery shown in FIG. 4. FIG. 11 is a side view of the other short lateral side of the core pack shown in FIG. 10, as viewed in the direction of arrow. FIG. 12 is an enlarged perspective view illustrating the second outer cover of the lithium rechargeable battery shown in FIG. 2. FIG. 13 is a plan view of the second outer cover shown in FIG. 12, as viewed in the direction of arrow. FIG. 14 is a partial cross-sectional view partially illustrating a coupling portion between the second outer cover and the other short lateral side of the bare cell having the lead plate provided thereon when the second outer cover is coupled to the other short lateral side of the core pack shown in FIG. 12.

Referring to FIGS. 10 and 11 second coupling portion 155a of second lead plate 155 is arranged above other short lateral side 122b of bare cell 100 and second connecting portion 155b is arranged on top side 121 of bare cell 100.

More specifically, second coupling portion 155a of second lead plate 155 is welded to base plate 170 that has been welded to the other short lateral side 122b of bare cell 100 so that it is coupled to the other short lateral side 122b of bare cell 100, and second connecting portion 155b connected to second electrical connection terminal 214 of protective circuit module 200 shown in FIG. 2 by, for example, welding is coupled to top side 121 of bare cell 100. As shown in FIG. 10, second coupling portion 155a of second lead plate 155 is arranged above the other short lateral side 122b of the bare cell 100 with a uniform thickness, which causes the outer surface of second coupling portion 155a of second lead plate 155 to be separated from other short lateral side 122b of bare cell 100 by a distance $D_2$. As shown in FIG. 11, second lead plate 155 including second coupling portion 155a and second connecting portion 155b has a smaller width $W_{11}$ than width $W_{bb}$ of the other short lateral side 122b of bare cell 100 so that it is easily arranged on the other short lateral side 122b and top side 121 of bare cell 100. In FIG. 11, widths $W_{d11}$ and $W_{d22}$ indicate the difference between width $W_{bb}$ of other short lateral side 122b of bare cell 100 and width $W_{11}$ of second coupling portion 155a of second lead plate 155. Of course, second coupling portion 155a of second lead plate 155 may be coupled to the other short lateral side 122b of bare cell 100 such that their longitudinal edges are aligned with each other. In this case, the difference between the widths of second coupling portion 155a of second lead plate 155 and the other short lateral side 122b may be represented by only width $W_{d11}$.

In FIG. 11, "S2" indicates a second area, which is a portion where the other short lateral side 122b of bare cell 100 that does not overlap second coupling portion 155a of second lead plate 155. Second area S2 is formed from the upper part to the lower part direction of the other short lateral side 122b of bare cell 100 including second edges 127.

As described before, second outer cover 340 that is formed beforehand by injection molding is coupled to other short lateral side 122b of bare cell 100 to cover the other short lateral side 122b of bare cell 100 having second coupling portion 155a of second lead plate 155 provided thereon. The structure of second outer cover 340 will be described below with reference to FIGS. 12 to 14.

Referring to FIGS. 12 to 14, second outer cover 340 of the lithium rechargeable battery according to the first embodiment of the invention includes a second plane 342, a second skirt surface 344, and second ribs 346.

Second plane 342 faces the other short lateral side 122b of bare cell 100, and has a shape corresponding to that of the other short lateral side 122b. In addition, second plane 342 extends up to the top side 121 of bare cell 100.

Second skirt surface 344 extends from at least a portion of the edge of second plane 342 in a direction, that is, toward the other short lateral side 122b of bare cell 100, so as to cover portions of two long lateral sides 123a and 123b and bottom side 124 of bare cell 100 shown in FIG. 2. In this embodiment, the second skirt surface 344 extends from both sides and a lower end of second plane 342 in a "U" shape. That is, second skirt surface 344 extends in a "U" shape without having a portion corresponding to the upper part of the core pack where resin molding part 400 is formed. Second skirt surface 344 is coupled to two long lateral sides 123a and 123b and bottom side 124 of bare cell 100 shown in FIG. 2 to cover the other short lateral side 122b of bare cell 100.

Second ribs 346 are formed in bar shapes to fill up gaps formed between second outer cover 340 and the other short lateral side 122b of bare cell 100 due to second lead plate 155 when second outer cover 340 is coupled to other short lateral side 122b of the bare cell 100. In this way, second ribs 346 can prevent resin from flowing into the gaps during a resin molding process of forming resin molding part 400 shown in FIG. 1. As a result, second ribs 346 are formed in a structure capable of isolating the gaps from resin molding part 400.

More specifically, second ribs 346 protrude from portions of the inner surface of second outer cover 340, that is, edges where second plane 342 and second skirt surface 344 intersect each other so as to be provided in second area S2 of FIG. 11. In this embodiment of the invention, as shown in FIG. 12, second ribs 346 are formed in second vertical bar shapes at the edges where second skirt surface 344 and second plane 342 corresponding to second area S2 intersect each other so as to extend to second area S2. However, because it is possible to prevent resin form flowing into the gap by blocking only a start portion of a flow path of resin when resin molding part 400 is formed, second rib 346 may be formed in a bar shape in only a portion that comes into surface contact with resin molding part 400 shown in FIG. 1, among the edges where second plane 342 and second skirt surface 344 intersect each other. Second ribs 346 may be integrally formed with second plane 342 and the second skirt surface 344.

As shown in FIG. 14, second rib 326 having a second vertical bar shape has a projection height $H_{vb2}$ equal to distance $D_2$ from other short lateral side 122b of bare cell 100 shown in FIG. 10 to the outer surface of second coupling portion 155a of second lead plate 155. This structure removes the gap between the inner surface of second outer cover 340 and the other short lateral side 122b of bare cell 100 having second coupling portion 155a of second lead plate 155 arranged thereon when second outer cover 340 is coupled to the other short lateral side 122b of bare cell 100. In addition, in order to remove the gap, width $W_{vb2}$ of the second rib 346 is equal to one of widths $W_{d11}$ and $W_{d22}$ corresponding to the difference between width $W_{bb}$ of the other short lateral side 122b of bare cell 100 and width $W_{11}$ of second coupling portion 155a of second lead plate 155.

As described above, each of second ribs 346 having the second vertical bar shape protrudes at a distance equal to the distance $D_2$ from the other short lateral side 122b of bare cell 100 to the outer surface of second coupling portion 155a of second lead plate 155, and the width $W_{vb2}$ of second rib 346 is equal to one of widths $W_{d11}$ and $W_{d22}$ corresponding to the difference between width $W_{bb}$ of the other short lateral side 122b of bare cell 100 and the width $W_{11}$ of second coupling portion 155a of second lead plate 155, which enables second ribs 356 each having the second vertical bar shape to be provided in the gaps between the inner surface of second outer cover 340 and the other short lateral side 122b of bare cell 100 when second outer cover 340 is coupled to the other short lateral side 122b of bare cell 100. In this way, second ribs 346 fill up the gaps between at least the upper part of the inner surface of second outer cover 340 and the other short lateral side 122b of bare cell 100, which makes it possible to prevent resin from flowing into second outer cover 340 through the gaps during a process of molding top side 121 of bare cell 100 including protective circuit module 200 with resin. Therefore, second ribs 346 prevent resin from flowing into second outer cover 340 and thus leaking from the lower part of second outer cover 340 due to high pressure. As a result, second ribs 346 make it possible to reduce defects in the appearance of second outer cover 340.

Figure 15:
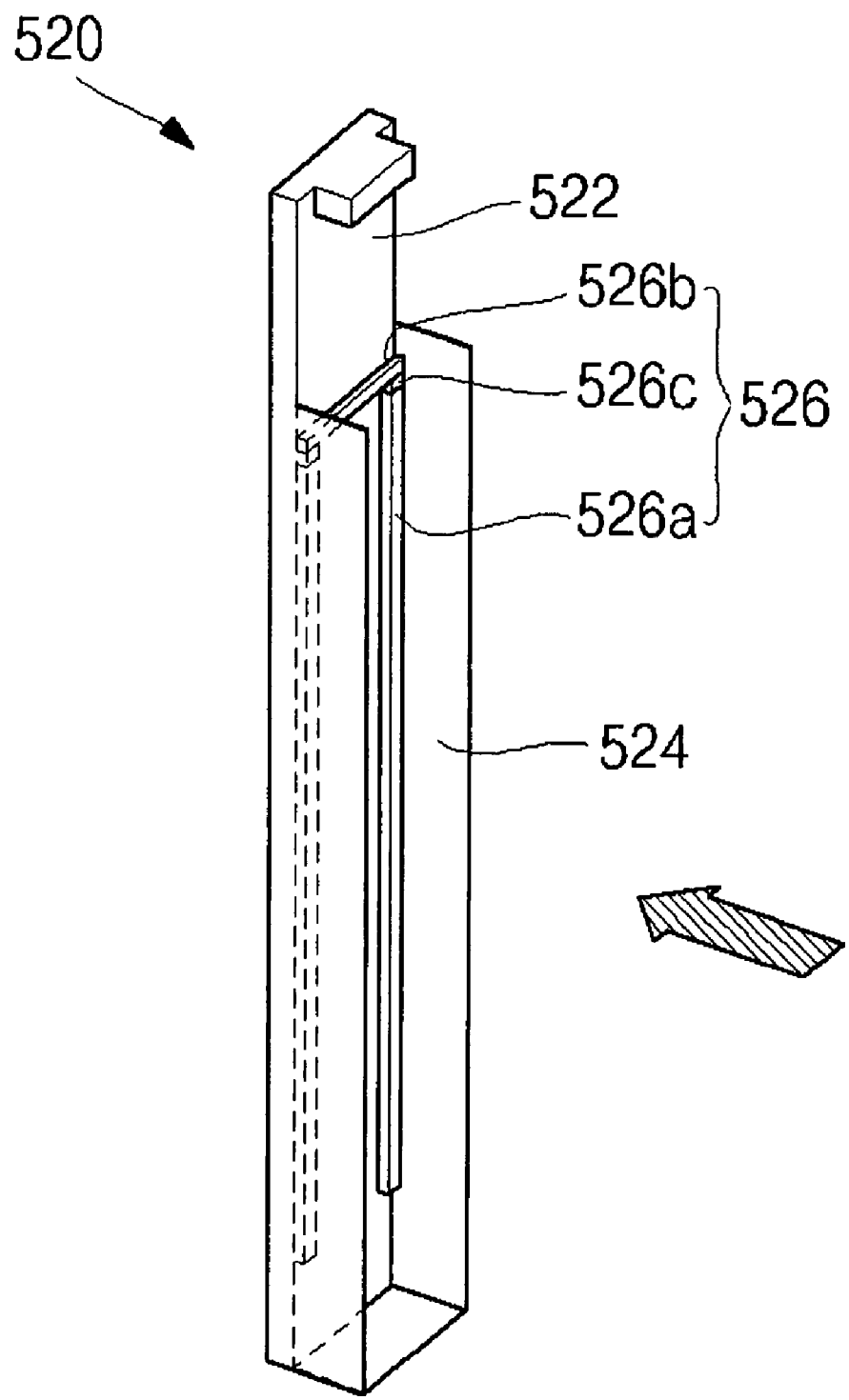
FIG. 15 is a perspective view illustrating a first outer cover according to a second embodiment of the invention.
Figure 16:
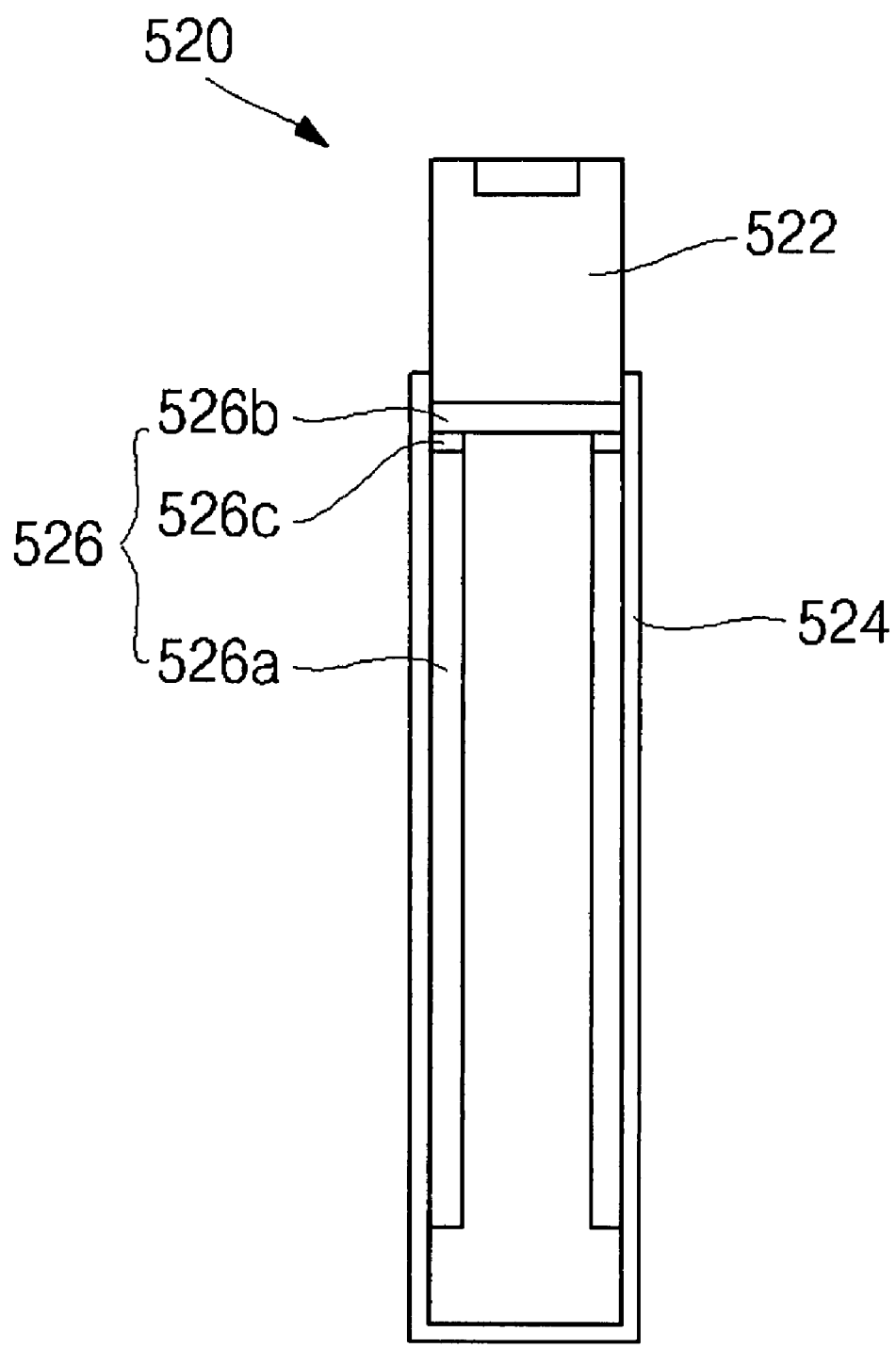
FIG. 16 is a plan view illustrating the first outer cover shown in FIG. 15, as viewed in the direction of arrow.

FIG. 15 is a perspective view illustrating a first outer cover according a second embodiment of the invention, and FIG. 16 is a plan view of the first outer cover shown in FIG. 15, as viewed in the direction of arrow.

A first outer cover 520 according to the second embodiment of the invention is similar to first outer cover 320 according to the first embodiment of the invention except for the structure of a first rib 526. Therefore, in this embodiment, a description of components having the same functions and structures as those in the first embodiment will be omitted, and thus a description of this embodiment is focused on first rib 526.

The first outer cover 520 according to the second embodiment of the invention includes a first plane 522, a first skirt surface 524, and a first rib 526.

First rib 526 protrudes from portions of the inner surface of first outer cover 520, and includes first vertical bars 526a, a first horizontal bar 526b, and first connecting bars 526c.

First vertical bar 526a is similar to first rib 326 according to the first embodiment in structure, and thus a description thereof will be omitted.

First horizontal bar 526b protrudes from first plane 522 and is formed at a position separated from the top side of the first vertical bars by a distance corresponding to the distance from top side 121 of bare cell 100 to the outer surface of first connecting portion 154b of the first lead plate 154 when first outer cover 520 is coupled to the one short lateral side 122a of bare cell 100 shown in FIGS. 5 and 6. In addition, a first connecting bars 526c protrude from first plane 522 so as to connect first vertical bars 526a to first horizontal bar 526b.

As described above, first rib 526 including first vertical bars 526a, first horizontal bar 526b, and first connecting bars 526c surrounds a bent portion of first lead plate 154 positioned at first edge 126 where top side 121 and the one short lateral side 122a of bare cell 100 intersect each other when first outer cover 520 is coupled to the one short lateral side 122a of bare cell 100 shown in FIGS. 5 and 6. That is, when first outer cover 520 is coupled to the one short lateral side 122a of bare cell 100, first rib 526 is provided on top side 121 of bare cell 100 as well as in the gaps between the inner surface of first outer cover 520 and the one short lateral side 122a of bare cell 100, which makes it possible to reliably prevent resin from flowing into first outer cover 520 in the resin molding process. First rib 526 may be integrally formed with first plane 522 and first skirt surface 524.

As such, first rib 526 of first outer cover 520 according to the second embodiment of the invention fills up the gap between at least the upper part of the inner surface of first outer cover 520 and the one short lateral side 122a of bare cell 100 by using first vertical bars 526a when first outer cover 520 is coupled to the one short lateral side 122a of bare cell 100, similar to first rib 326 of first outer cover 320 according to the first embodiment of the invention. In addition, first rib 526 of first outer cover 520 further includes the first horizontal bar 526b and first connecting bars 526c, unlike first rib 326 of first outer cover 320 according to the first embodiment of the invention, which makes it possible to more reliably prevent resin from flowing into first outer cover 520 in the subsequent resin molding process.

Figure 17:
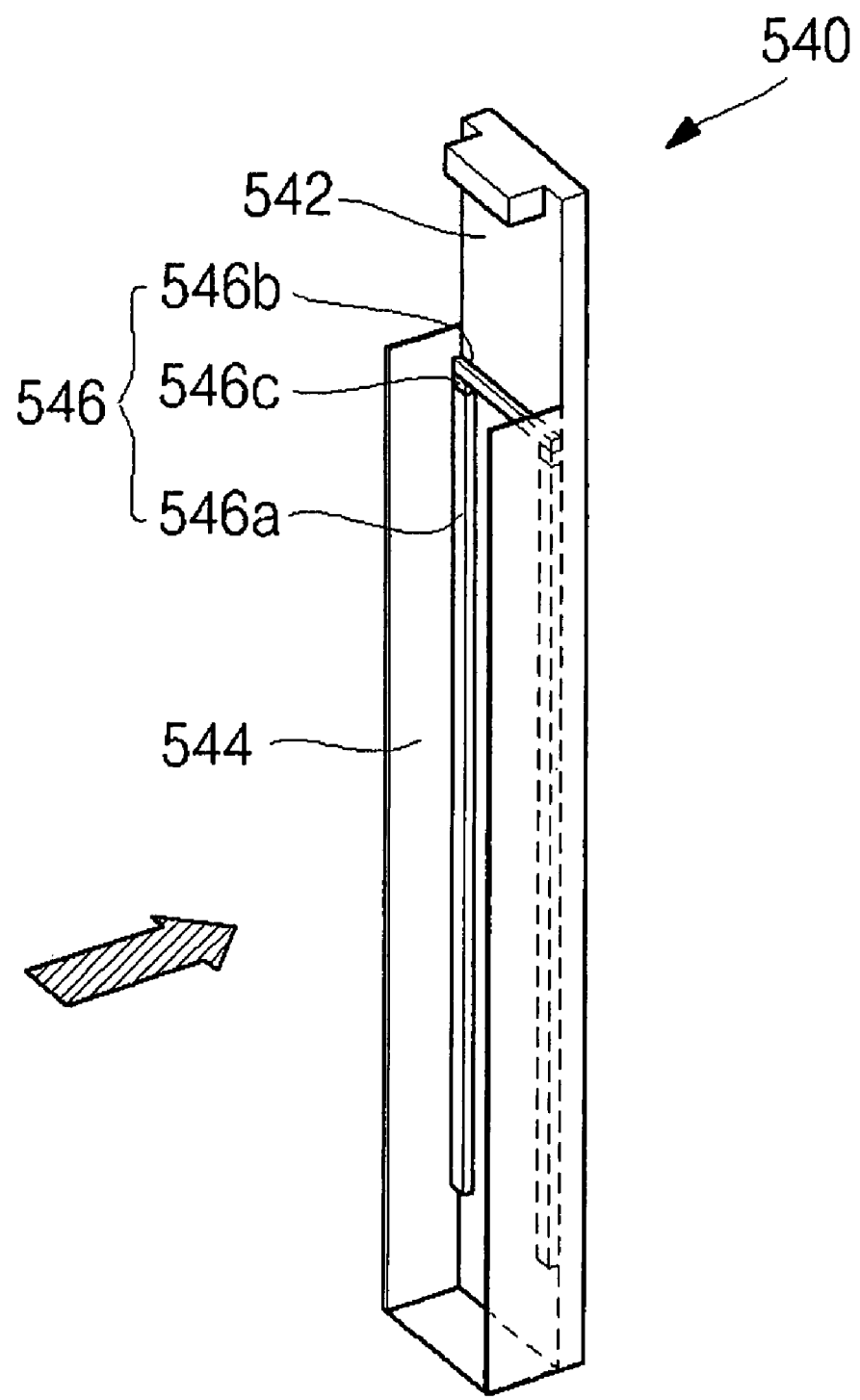
FIG. 17 is a perspective view illustrating a second outer cover according to the second embodiment of the invention.
Figure 18:
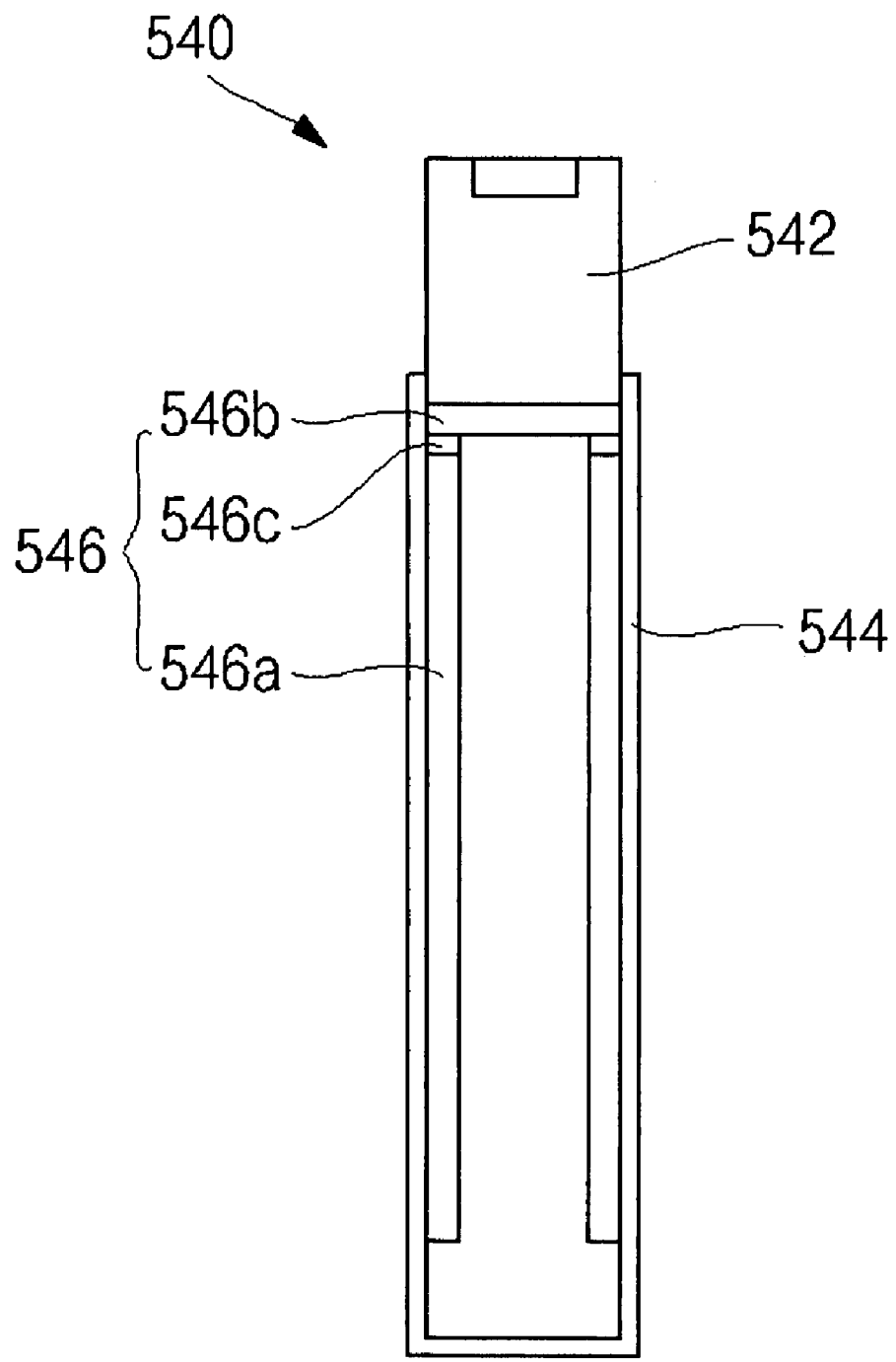
FIG. 18 is a plan view illustrating the second outer cover shown in FIG. 17, as viewed in the direction of arrow.

FIG. 17 is a perspective view illustrating a second outer cover according to the second embodiment of the invention, and FIG. 18 is a plan view of the second outer cover of FIG. 17, as viewed in the direction of arrow.

A second outer cover 540 according to the second embodiment of the invention is similar to second outer cover 340 according to the first embodiment except for the structure of a second rib 546. Therefore, in the second embodiment of the invention, a description of components having the same functions and structures as those in the first embodiment will be omitted, and thus a description of this embodiment is focused on second rib 546.

Second outer cover 540 according to the second embodiment of the invention includes a second plane 542, a second skirt surface 544, and a second rib 546.

Second rib 546 protrudes from portions of the inner surface of the second outer cover 540, and includes second vertical bars 546a, a second horizontal bar 546b, and second connecting bars 546c.

Second vertical bar 546a is similar to second rib 346 according to the first embodiment in structure, and thus a description thereof will be omitted.

Second horizontal bar 546b protrudes from the inner surface of second plane 542 and is formed at a position separated from the top side of the second vertical bars by a distance corresponding to the distance from top side 121 of bare cell 100 to the outer surface of second connecting portion 155b of second lead plate 155 when second outer cover 540 is coupled to the other short lateral side 122b of bare cell 100 shown in FIGS. 10 and 11. In addition, a second connecting bars 546c are provided to connect second vertical bars 546a to second horizontal bar 546b.

As described above, second rib 546 including second vertical bars 546a, second horizontal bar 546b, and second connecting bars 546c surrounds a bent portion of second lead plate 155 positioned at second edge 127 where top side 121 and the other short lateral side 122b of bare cell 100 intersect each other when second outer cover 540 is coupled to the other short lateral side 122b of bare cell 100 shown in FIGS. 10 and 11. That is, when second outer cover 540 is coupled to the other short lateral side 122b of bare cell 100, second rib 546 is provided on top side 121 of bare cell 100 as well as in the gaps between at least the upper part of the inner surface of second outer cover 540 and the other short lateral side 122b of bare cell 100, which makes it possible to reliably prevent resin from flowing into second outer cover 540 in the resin molding process. Second rib 546 may be integrally formed with second plane 542 and second skirt surface 544.

As such, second rib 546 of second outer cover 540 according to the second embodiment of the invention fills up the gap between at least the upper part of the inner surface of second outer cover 540 and the other short lateral side 122b of bare cell 100 by using second vertical bars 546a when second outer cover 540 is coupled to the other short lateral side 122b of bare cell 100, similar to second rib 346 of second outer cover 340 according to the first embodiment of the invention. In addition, second rib 546 of second outer cover 540 further includes second horizontal bar 546b and second connecting bars 546c, unlike second rib 346 of second outer cover 340 according to the first embodiment of the invention, which makes it possible to more reliably prevent resin from flowing into second outer cover 540 in the subsequent resin molding parting process.

As described above, in the lithium rechargeable battery according to the invention, the outer covers having ribs formed on the inner surfaces thereof are coupled to both sides of the core pack to prevent resin from flowing into the outer covers in a process of performing resin molding on the upper part of the core pack, which makes it possible to reduce defects occurring in the outer covers due to the flow of resin. As a result, it is possible to reduce defects in the manufacture of a lithium rechargeable battery.

As described above, although the exemplary embodiments of the invention have been described above, the invention is not limited thereto. Therefore, it would be appreciated by those skilled in the art that various modifications and changes of the invention can be made without departing from the scope of the invention, the scope of which is defined in the appended claims and their equivalents.

What is claimed is:

1. A lithium rechargeable battery, comprising:
a core pack including a bare cell and a protective circuit module, the bare cell comprising a pair of first surfaces disposed opposite to each other, the pair of first surfaces being spaced apart from each other by a plurality of lateral surfaces, the protective circuit module being arranged on a first lateral surface of the bare cell and being electrically connected to the bare cell through lead plates;
outer covers respectively covering second and fourth lateral surfaces of the bare cell on which the lead plates are respectively provided, the second and fourth lateral surfaces being disposed opposite to and spaced apart from each other, the second and fourth lateral surfaces being connected by the first lateral surface;
a resin molding part disposed to cover a portion of each outer cover and the protective circuit module; and
ribs protruding from the inner surfaces of the outer covers, the ribs physically isolating gaps which are disposed between the outer covers and the corresponding lateral surfaces from the resin molding part, the ribs being in a surface contact with the resin molding part.

2. The lithium rechargeable battery as recited in claim 1, wherein the ribs formed in bar shapes to fill up the gaps.

3. The lithium rechargeable battery as recited in claim 2, with the lead plates including a first lead plate and a second lead plate,
wherein the first lead plate comprises a first coupling portion that is electrically connected to an electrode terminal protruding from the second lateral surface of the bare cell and is electrically insulated from the second lateral surface of the bare cell, and a first connecting portion that is bent and extended from the first coupling portion and is electrically connected to a first electrical connection terminal of the protective circuit module, the first connecting portion being electrically insulated from the first lateral surface of the bare cell, and the second lead plate comprises a second coupling portion that is electrically connected to the fourth lateral surface of the bare cell, and a second connecting portion that is bent and extended from the second coupling portion and is arranged on the first lateral surface of the bare cell so as to be connected to a second electrical connection terminal of the protective circuit module.

4. The lithium rechargeable battery as recited in claim 3, with each of the first and second coupling portions having a smaller width than those of the second and fourth lateral surfaces of the bare cell.

5. The lithium rechargeable battery as recited in claim 4, wherein the outer covers include a first outer cover covering the second lateral surface of the bare cell and a second outer cover covering the fourth lateral surface of the bare cell, and
a first rib formed on the inner surface of the first outer cover comprises first bars extending to first areas which are first portions of the second lateral surface of bare cell, and said first portions do not overlap with the first coupling portion of the first lead plate.

6. The lithium rechargeable battery as recited in claim 5, wherein a second rib formed on the inner surface of the second outer cover comprises second bars extending to second areas which are second portions of the fourth lateral surface of the bare cell, and said second portions do not overlap the second coupling portion of the second lead plate.

7. The lithium rechargeable battery as recited in claim 6, wherein the first rib further comprises a third bar that is provided at a position spaced apart from ends of the first bars by a distance corresponding to the distance from the second lateral surface of the bare cell to the outer surface of the first connecting portion of the first lead plate, and first connecting bars that respectively physically connect the third bar to the first bars.

8. The lithium rechargeable battery as recited in claim 7, wherein the second rib further comprises a fourth bar that is provided at a position spaced apart from ends of the second bars by a distance corresponding to the distance from the fourth lateral surface of the bare cell to the outer surface of the second connecting portion of the second lead plate, and second connecting bars that respectively physically connect the fourth bar to the second bars.

9. The lithium rechargeable battery as recited in claim 8, wherein the first outer cover comprises a first plane that has a shape corresponding to the second lateral surface of the bare cell, and a first skirt surface that extends from at least a portion of the edge of the first plane in a direction so as to cover the pair of first surfaces and a third lateral surface of the bare cell disposed opposite to and spaced apart from the first lateral surface of the bare cell, and
the second outer cover comprises a second plane that has a shape corresponding to the fourth lateral surface of the bare cell and a second skirt surface that extends from at least a portion of the edge of the second plane in a direction so as to cover the pair of first surfaces and the third lateral surface of the bare cell.

10. The lithium rechargeable battery as recited in claim 9, wherein the first rib is arranged in a portion that comes into a surface contact with the resin molding part, at the edges where the first plane and the first skirt surface intersect each other, and
the second rib is arranged in a portion that comes into a surface contact with the resin molding part, at the edges where the second plane and the second skirt surface intersect each other.

11. The lithium rechargeable battery as recited in claim 9, wherein each of the first skirt surface and the second skirt surface is formed in a U shape without having a portion corresponding a portion of the core pack on which the resin molding part is formed.

12. The lithium rechargeable battery as recited in claim 9, wherein the first bars of the first rib protrude from the inner surface of the first plane, the projection height of each of the first bars is equal to the distance from the second lateral surface of the bare cell to the outer surface of the first coupling portion of the first lead plate, and the widths of the first bars are equal to the difference between the width of the second lateral surface of the bare cell and the width of the first coupling portion of the first lead plate.

13. The lithium rechargeable battery as recited in claim 9, wherein the second bars of the second rib protrude from the inner surface of the second plane, the projection height of each of the second bars is equal to the distance from the fourth lateral surface of the bare cell to the outer surface of the second coupling portion of the second lead plate, and the widths of the second bars are equal to the difference between the width of the fourth lateral surface of the bare cell and the width of the second coupling portion of the second lead plate.

14. The lithium rechargeable battery as recited in claim 3, wherein an electrically insulating tape is provided between the inner surface of the first coupling portion of the first lead plate and the second lateral surface of the bare cell.

15. The lithium rechargeable battery as recited in claim 14, wherein the electrically insulating tape has a thickness equal to the height of the electrode terminal protruding from the second lateral surface of the bare cell.

16. The lithium rechargeable battery as recited in claim 3, wherein a base plate is further provided between the fourth lateral surface of the bare cell and the inner surface of the second coupling portion of the second lead plate.

17. The lithium rechargeable battery as recited in claim 1, wherein the ribs are integrally formed with the corresponding outer cover.

* * * * *